US008676790B1

(12) United States Patent  
Henzinger et al.

(10) Patent No.: US 8,676,790 B1
(45) Date of Patent: Mar. 18, 2014

(54) METHODS AND SYSTEMS FOR IMPROVING SEARCH RANKINGS USING ADVERTISING DATA

(75) Inventors: Monika Henzinger, Corseaux (CH); Alexander Mark Franz, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 2640 days.

(21) Appl. No.: 10/728,673

(22) Filed: Dec. 5, 2003

(51) Int. Cl.
*G06F 17/30* (2006.01)

(52) U.S. Cl.
USPC .......................................... 707/723; 707/728

(58) Field of Classification Search
USPC ................. 707/3, 4, 5, 6, 100, 102, 705–708, 707/722–731, 769–771
See application file for complete search history.

(56) References Cited

U.S. PATENT DOCUMENTS

| | | | | |
|---|---|---|---|---|
| 5,463,725 | A | 10/1995 | Henckel et al. | 715/776 |
| 5,721,827 | A | 2/1998 | Logan et al. | 709/217 |
| 5,909,207 | A | 6/1999 | Ho | 345/156 |
| 5,933,811 | A | 8/1999 | Angles et al. | 705/14 |
| 6,006,222 | A | 12/1999 | Culliss | 707/5 |
| 6,014,665 | A | 1/2000 | Culliss | 707/5 |
| 6,064,384 | A | 5/2000 | Ho | 715/839 |
| 6,078,916 | A * | 6/2000 | Culliss | 707/5 |
| 6,182,068 | B1 | 1/2001 | Culliss | 707/5 |
| 6,185,559 | B1 | 2/2001 | Brin et al. | 707/6 |
| 6,199,082 | B1 | 3/2001 | Ferrel et al. | 715/522 |
| 6,229,502 | B1 | 5/2001 | Schwab | 345/1.1 |
| 6,285,999 | B1 | 9/2001 | Page | 705/5 |
| 6,438,233 | B1 | 8/2002 | Yoshimune et al. | 380/241 |
| 6,486,895 | B1 | 11/2002 | Robertson et al. | 715/776 |
| 6,496,803 | B1 | 12/2002 | Ho et al. | 707/14 |
| 6,526,440 | B1 | 2/2003 | Bharat | 709/219 |
| 6,529,903 | B2 | 3/2003 | Smith et al. | 707/7 |
| 6,615,209 | B1 | 9/2003 | Gomes et al. | 707/5 |
| 6,658,423 | B1 | 12/2003 | Pugh et al. | 707/102 |
| 6,678,681 | B1 | 1/2004 | Brin | 707/6 |
| 6,701,301 | B2 | 3/2004 | Seet et al. | 705/14 |
| 6,725,203 | B1 | 4/2004 | Seet et al. | 705/14 |
| 6,725,259 | B1 | 4/2004 | Bharat | 709/219 |
| 6,754,873 | B1 | 6/2004 | Law et al. | 715/501.1 |
| 7,165,039 | B2 | 1/2007 | Seet et al. | 707/13 |
| 2001/0050658 | A1 | 12/2001 | Adams | 345/4 |
| 2002/0035697 | A1 | 3/2002 | McCurdy et al. | 726/3 |
| 2002/0042791 | A1 | 4/2002 | Smith et al. | 707/5 |
| 2002/0069114 | A1 | 6/2002 | Charette et al. | 707/26 |

(Continued)

FOREIGN PATENT DOCUMENTS

| | | |
|---|---|---|
| JP | 05011965 | 1/1993 |
| JP | 11-122555 | 4/1999 |

(Continued)

OTHER PUBLICATIONS

Brin, Sergey et al., "The Anatomy of a Large-Scale Hypertextual Web Search Engine," 1998, Computer Science Department, Stanford University, Stanford, CA.

*Primary Examiner* — Wilson Lee
(74) *Attorney, Agent, or Firm* — Fish & Richardson P.C.

(57) ABSTRACT

Systems and methods for improving search rankings using advertising data are disclosed. In one embodiment, a search engine implements a method comprising receiving a search query, identifying a plurality of articles relevant the search query, determining advertising data associated with the search query, and ranking the articles based at least in part on the advertising data.

44 Claims, 2 Drawing Sheets

(56) References Cited

U.S. PATENT DOCUMENTS

| | | |
|---|---|---|
| 2002/0123988 A1 | 9/2002 | Dean et al. ............... 707/3 |
| 2002/0133481 A1 | 9/2002 | Smith et al. ............... 707/3 |
| 2004/0024752 A1* | 2/2004 | Manber et al. ............ 707/3 |
| 2004/0059708 A1 | 3/2004 | Dean et al. |
| 2004/0119740 A1 | 6/2004 | Chang et al. ............ 715/751 |
| 2004/0122811 A1 | 6/2004 | Page ........................ 707/3 |
| 2004/0267725 A1* | 12/2004 | Harik ........................ 707/3 |
| 2005/0065959 A1* | 3/2005 | Smith et al. ............ 707/102 |
| 2005/0071224 A1* | 3/2005 | Fikes et al. ............... 705/14 |
| 2005/0071741 A1 | 3/2005 | Acharya et al. ........ 715/500 |
| 2005/0114198 A1* | 5/2005 | Koningstein et al. ..... 705/10 |

FOREIGN PATENT DOCUMENTS

| | | |
|---|---|---|
| JP | 2000-56721 | 2/2000 |
| JP | 2000-113177 | 4/2000 |
| JP | 2000-231475 | 8/2000 |

* cited by examiner

METHODS AND SYSTEMS FOR IMPROVING SEARCH RANKINGS USING ADVERTISING DATA

FIELD OF THE INVENTION

The invention generally relates to search engines. More particularly, the invention relates to methods and systems for improving search rankings using advertising data.

BACKGROUND OF THE INVENTION

A search engine or search engine program is a widely used mechanism for allowing users to search vast numbers of documents for information. Automated search engines locate websites by matching terms from a user entered search query to an indexed corpus of web pages. A conventional network search engine, such as the Google™ search engine, returns a search result set in response to the search query submitted by the user. The search engine can perform the search based on conventional search methods. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine can rank or sort the individual articles or documents in the result set based on a variety of measures, such as, the number of times the search terms appear in the document and the number of documents that contain a link to a document. A search result set comprising a ranked list of documents with a link to each document can be returned to the user.

Publishers or authors of a document, such as a web page, can use a variety of techniques to manipulate the document to increase the ranking of the document by a search engine. With a high ranking, a user is more likely to click on the manipulated document from the search results.

Generally, a search engine attempts to provide the most relevant search results in response to a user's query. A user's search experience is degraded if the search results are not particularly relevant. The more information a search engine has about documents and search terms, the better determination it can make regarding the relevancy of the documents and thus, the better it can rank the documents.

Thus, a need exists to increase the accuracy of the ranking of documents in search results.

SUMMARY

Embodiments of the present invention comprise methods and systems for improving search rankings using advertising data. In one embodiment, a search engine implements a method comprising receiving a search query, identifying a plurality of articles relevant to the search query, determining advertising data associated with the search query, and ranking the articles based at least in part on the advertising data. The advertising data can comprise information related to search advertisements associated with the search query and information related to content advertisements associated with the articles. Additional aspects of the present invention are directed to computer systems and to computer-readable media having features relating to the foregoing aspects.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
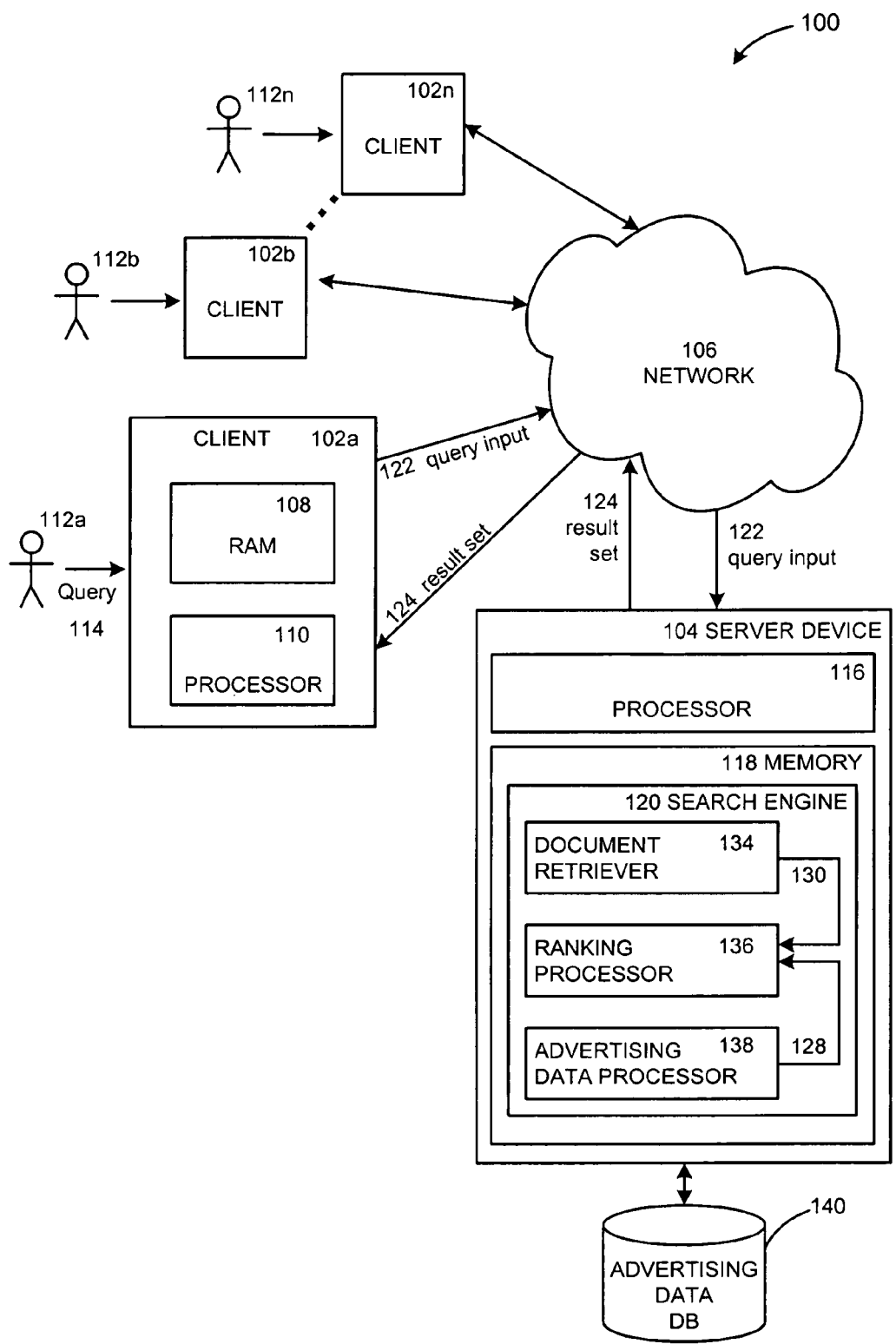
FIG. 1 is a diagram illustrating an exemplary environment in which one embodiment of the present invention may operate.

The present invention comprises methods and systems for improving search rankings using advertising data. Referring now to the drawings in which like numerals indicate like elements throughout the several figures, FIG. 1 is a block diagram illustrating an exemplary environment for implementation of an embodiment of the present invention. The system 100 shown in FIG. 1 includes multiple client devices 102$a$-$n$ in communication with a server device 104 over a network 106. The network 106 shown includes the Internet. In other embodiments, other networks, such as an intranet may be used. Moreover, methods according to the present invention may operate within a single computer.

The client devices 102$a$-$n$ shown each includes a computer-readable medium, such as a random access memory (RAM) 108 coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102$a$, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102$a$-$n$ may also include a number of external or internal devices such as a mouse, a CD-ROM, DVD, a keyboard, a display, or other input or output devices. Examples of client devices 102$a$-$n$ are personal computers, digital assistants, personal digital assistants, cellular phones, mobile phones, smart phones, pagers, digital tablets, laptop computers, Internet appliances, and other processor-based devices. In general, a client device 102$a$ may be any type of processor-based platform that is connected to a network 106 and that interacts with one or more application programs. Client devices 102$a$-$n$ may operate on any operating system capable of supporting a browser or browser-enabled application, such as Microsoft® Windows® or Linux. The client devices 102*a-n* shown include, for example, personal computers executing a browser application program such as Microsoft Corporation's Internet Explorer™, Netscape Communication Corporation's Netscape Navigator™, and Apple Computer, Inc.'s Safari™.

Through the client devices 102*a-n*, users 112*a-n* can communicate over the network 106 with each other and with other systems and devices coupled to the network 106. As shown in FIG. 1, a server device 104 is also coupled to the network 106. In the embodiment shown, a user 112*a-n* generates a search query 114 at a client device 102*a*. The client device 102*a* transmits the query 114 to the server device 104 via the network 106. For example, a user 112*a* types a textual search query into a query field of a web page of a search engine interface or other client-side software displayed on the client device 102*a*, which is then transmitted via the network 106 to the server device 104. In the embodiment shown, a user 112*a* inputs a search query 114 at a client device 102*a*, which transmits an associated search query input 122 reflecting the search query 114 to the server device 104. The search query 114 may be transmitted directly to the server device 104 as shown. In another embodiment, the query input 122 may instead be sent to a proxy server (not shown), which then transmits the query input 122 to server device 104. Other configurations are possible.

The server device 104 shown includes a server executing a search engine application program, such as the Google™ search engine. Similar to the client devices 102*a-n*, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant articles in response to a search query 114 from a user 112*a-n*. The search engine 120 then provides the result set 124 to the client 102*a* via the network 106. The result set 124 can include a ranked list of articles, such as web pages, and a link to each article.

In the embodiment shown, the server device 104, or related device, performs a crawl of the network 106 to locate articles, such as web pages, stored at other devices or systems connected to the network 106, and indexes the articles in memory 118 or on another data storage device prior to receiving and processing a search query 114. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

The search engine 120 shown includes a document retriever 134, a ranking processor 136, and an advertising data processor 138. In the embodiment shown, each comprises computer code residing in the memory 118. The document retriever 134 identifies a set of documents that are responsive to the search query 114 from a user 112*a*. In the embodiment shown, this can be accomplished by accessing an index of documents, indexed in accordance with the terms contained in the documents, and matching the terms used in the search query with the terms used in the documents. The advertising data processor 138 determines advertising data that relates to the search query and the returned documents. The ranking processor 136 can rank or score the located set of documents based upon relevance to a search query 114 and other available criteria or information, such as advertising data received from the advertising data processor 138 to compile a search result set 124. The search result set 124 can be transmitted to the client device by the search engine 120 via network 106. Other functions and characteristics of the document retriever 134, ranking processor 136, and advertising data processor 138 are further described below.

Server device 104 also provides access to other storage elements, such as an advertising data storage element, in the example shown an advertising data database 140. Data storage elements may include any one or combination of methods for storing data, including without limitation, arrays, hash tables, lists, and pairs. Other similar types of data storage devices can be accessed by the server device 104. The advertising data database 140 stores data associated with advertisements or advertising data.

For example, some search engines can cause the display of search advertisements associated with a search query along with a search result set. Users can select the advertisement by clicking on the search advertisement and be forwarded to a document, such as a web page, from the advertiser. Advertising data from the search advertisements, such as what advertisements users clicked on for what search terms, the ratio or number of users that clicked on particular search advertisements, and the number of users that purchased an advertised product after clicking of the advertisement can be stored in the advertising data database 140.

Content advertisements can also be displayed on source documents, such as web pages, based on the content of the source document. With content advertising, a content advertisement is requested by the publisher of a source document from a provider each time a user visits the page. The provider can match a content advertisement with the content of the source document. Typically, the provider determines the content of the source document by determining a set of content terms that describe the document. Users can generally click on the content advertisement and be forwarded to a document, such as a web page, from the advertiser. Advertising data from the content advertisements, such as the number of visits to a source document, the set of content terms, and the text of the content advertisements, can be stored in the advertising data database.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIG. 2.

Various methods in accordance with the present invention may be carried out. For example, one embodiment comprises receiving a search query, identifying a plurality of articles relevant to the search query, determining advertising data associated with the search query, and ranking the articles based at least in part on the advertising data. The advertising data can include information related to search advertisements associated with the search query and information related to content advertisements associated with the articles. The advertising data is used to impact the ranking of the articles.

Preferably, the advertising data provides additional meaning to the articles and can also indicate what users are generally interested in when using the search query.

The identified articles may be ranked against each other and presented in a ranked order to the user submitting the query. Preferably, this results in a ranking that provides the most relevant articles to the user first.

In one embodiment, the advertising data comprises a selection score for each search advertisement displayed for the search query. The selection score can be based at least in part on a number of users that selected a search advertisement when displayed for the search query, such as a ratio or percentage of users that selected the search advertisement. In this embodiment, ranking of the articles can be determined by weighting the articles based at least in part on the selection scores for the search advertisements.

In one embodiment, the advertising data comprises content advertising visit data associated with at least a first article. The content advertising visit data can be based at least in part on a number of users that visited the first article. In this embodiment, ranking can comprise weighting the first article based at least in part on the content advertisement visit data.

In one embodiment, the advertising data comprises a selection score for each content advertisement displayed on a first article. The selection score can be based at least in part on a number of users that selected a content advertisement when the content advertisement was displayed with the first article, such as a ratio or percentage of users that selected the content advertisement. In this embodiment, the ranking of the first article can be determined at least in part by augmenting the text of the first article with the advertising terms from a content advertisement with a highest selection score or with advertising terms from a plurality of advertisements with high selection scores. Alternatively, the ranking of the first article can be determined at least in part by augmenting the text of the first article with weighted advertising terms, wherein the advertising terms are weighted based on the selection score of the content advertisement that they came from.

In one embodiment, the first article is a source article and comprises content terms representing the content of the first article. The content terms can be determined by an advertising provider, so that the provider can match an advertisement to the terms. The provider can then cause the display of a matched advertisement on the source article. In this embodiment, the ranking of the first article can be determined at least in part by augmenting the text of the first article with the content terms.

Figure 2:
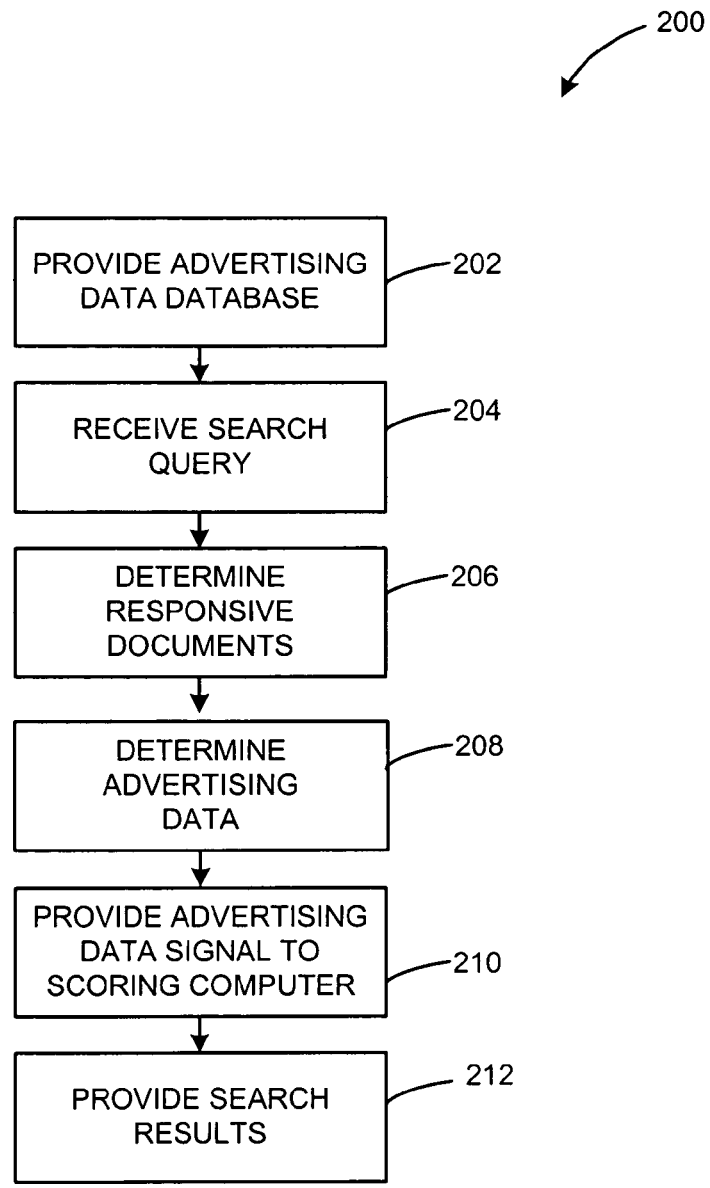
FIG. 2 is a flow diagram of a method of improving search rankings using advertising data in one embodiment of the present invention.

FIG. 2 illustrates an exemplary method 200 that provides a method for improving search rankings using advertising data. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, an advertising data database 140 is provided. This may be accomplished by, for example, constructing such a database or establishing communication with such a database. As described with reference to FIG. 1, the advertising data database 140 stores advertising data.

In 204, a search query, in the form of a search query input, is received by the server device 104. In the embodiment shown, a user 112a generates a search query 114 at a client device 102a. The client device 102a transmits an associated search query input 122 reflecting the search query 114 to the server device 104 via a network 106. The search engine 120 receives the search query input 122 and processes the search query 114. For example, if the user 112a types a search query "jaguar" into the search or query field of a search page on a browser application program, the client 102a transmits a search query input 122 that includes the text "jaguar" or some other representation or indication of "jaguar." The search engine 120 receives the query input 122 and determines that "jaguar" is the desired search query 114.

In 206, documents responsive to the search query can be determined. The document retriever 134 conducts a search for documents responsive to the search query in a search database (not shown) or memory 118 that have previously been indexed from the network 106 or devices connected to the network. Based on the search, the document retriever 134 determines a list of documents related to the search query. This list of documents can be referred to as the initial search result set for the search query 114. In one embodiment, the document retriever 134 can determine the initial search result set based on a conventional search engine query and results return, such as by matching terms contained in the document with the terms in the search query.

For example, the document retriever 134 shown can determine an initial search result set responsive to the search query "jaguar." This initial search result set for "jaguar" can comprise a list of documents determined to include the term "jaguar" in the documents. Other methods of determining an initial search result set can be used.

In 208, advertising data is determined. The advertising data processor 138 can determine and retrieve advertising data related to the search query from the advertising data database 140. The retrieved advertising data can be used by the advertising data processor 138 to create advertising data signals that can be used to sort and rank documents in the initial search result set. In one embodiment, an advertising data signal can be a weighted value for a document returned in the initial search result set. An advertising data signal can also be a set of terms associated with a user query. These terms can be selected by the set of terms associated with advertisements highly selected by users when displayed with the results for the user query. Alternatively, an advertising data signal can be a set of terms associated with a document returned in the initial search result set. Advertising data may not be available for all documents returned in the initial search results set. A document may have more than one advertising data signal associated with it or if a document has no relevant advertising data it may have no associated advertising data signal.

As explained above, advertising data may comprise information concerning search advertisements, such as, for example, the search advertisements displayed for search terms and selection data for the search advertisements. The selection data or score can represent for each search advertisement the number of times users click on the advertisement when it is displayed, such as a ratio or percentage of users that click on the advertisement or type of advertisement. For example, when the user inputs the search query "jaguar" the advertising data processor 138 can retrieve advertising data concerning search advertisements previously displayed for the search term "jaguar" and the selection data about the search advertisements. The advertising data may indicate that the search advertisements for "jaguar" related to three distinct concepts, automobiles, large cats, and football, and the selection data may indicate that 70% of the users selected the automobile advertisements, 10% of the users selected the large cat advertisements, and 20% of the users selected the football advertisements. The advertising data processor 138 can use this advertising data to determine advertising data signals that more heavily weight documents in the initial search result set for "jaguar" that relate to automobiles than large cats or football.

Advertising data may also comprise information concerning content advertisements. Content advertising involves placing an advertisement on a source document based on the content of the source document. The content of the source document can be defined by a set of content terms. Content advertising data for source documents can include, for example, the number of visits to a source document (visit data), the set of content terms used to describe the content of the source document, and the terms of the content advertisements. For example, for a document in the initial search result set that is also a source document, an advertising data signal for this document can represent the number of visits to the document by users. An advertising data signal for a source document can also contain the set of content terms. Additionally, the advertising data processor 138 can, based on selection information, determine the content advertisement or group of content advertisements most selected by users viewing the source document. The terms from the most selected content advertisement or group of advertisements can be contained in an advertising data signal for the source document. A variety of other advertising data can be used to generate an advertising data signal for a search query and documents relevant to a search query.

In 210, advertising data signals 128 for the documents in the initial search result set are provided to the ranking processor 136 for determining rankings or scores of the initial search result set. The ranking processor 136 includes a ranking or scoring function or set of computer-executable instructions that incorporates the advertising data signals 128 and/or other output from the advertising data processor 138. For example, advertising data signals 128 containing a weighted value and set of terms generated in step 208 are transmitted to the ranking processor 136, which utilizes the advertising data signals 128 to rank or otherwise score the initial search result set. Other signals 130 generated for each document by the search engine 120 or another system or method can also be transmitted to the ranking processor 136 to rank or score subsequent search results.

In 212, a search result set 124 can be provided by the search engine 120 to the client device 102a via the network 106. The ranking processor 136 generates a ranking or scoring of each document located in the initial search result set in response to the search query input 122. Using the advertising data signal 128 from step 210, the ranking processor 136 affects the ranking or scoring of one or more documents located in an initial search result set. For example, for the initial result set responsive to the search query "jaguar", if the ranking processor 136 receives an advertising data signal or signals 128 that weight the documents associated with the concept of automobiles higher than other concepts, the ranking processor 136 can use these signals to increase the rank of the documents associated with the concept of automobiles in the search result set. The ranking processor 136 can receive an advertising data signal containing terms associated with a highly selected search advertisement or a group of search advertisements and can use these terms to increase the rank of documents containing these terms. In another example, if the ranking processor 136 receives an advertising data signal 128 indicating a high number of visitors to a document in the initial result set, the ranking processor 136 can use this signal to increase the ranking of the document. The ranking processor 136 can use this visitation signal in a hyperlink structure-based ranking method or can compare it to visitation signals for other documents to determine a ranking for the document.

In a further example, if the ranking processor 136 receives an advertising data signal, for a document, that contains the content terms of the document, the ranking processor 136 can use the content terms to augment the text of the document in the ranking function. Similarly, if the ranking processor 136 receives an advertising data signal 128, for a document, that contains advertising terms from the a highly selected content advertisement displayed on the document, the ranking processor 136 can use the advertising terms to augment the text of the document in the ranking function. Alternatively, if the ranking processor 136 receives an advertising data signal 128, for a document, that contains advertising terms from the content advertisements displayed on the document, the ranking processor can augment the text of the document with the advertising terms weighted by the selection information for the content advertisement containing the terms.

The ranking processor 136 can use other signals in conjunction with the advertising data signal to rank or otherwise score documents of an initial search result set. In some instances, the ranking processor 136 can further decide whether to utilize a particular advertising data signal and/or other signals during processing of a score or ranking for a search result 124.

By using advertising data, a better understanding of what users desire when inputting search queries and a better understanding of the documents can be determined. Additionally, it is very difficult for document authors or publishers to manipulate advertising data. The use of advertising data in ranking documents identified in response to a search query can improve the quality of the search results.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method for ranking search results using a processor-based device, the method comprising:
   receiving a search query;
   identifying a plurality of articles relevant to the search query;
   identifying advertisements associated with the search query;
   determining advertising data associated with the advertisements; and
   ranking the articles based at least in part on the advertising data.

2. The method of claim 1, wherein determining advertising data comprises determining information related to search advertisements associated with the search query.

3. The method of claim 1, wherein determining advertising data comprises determining information related to content advertisements associated with at least a first article from the plurality of articles.

4. The method of claim 2, wherein the advertising data comprises a selection score for each search advertisement displayed for the search query.

5. The method of claim 4, wherein the selection score is based at least in part on a number of users that selected a search advertisement when displayed for the search query.

6. The method of claim 4, wherein the selection score comprises a ratio of users that selected a search advertisement when displayed for the search query.

7. The method of claim 4, wherein ranking the articles comprises weighting the articles based at least in part on the selection scores for the search advertisements.

8. The method of claim 3, wherein the advertising data comprises content advertising visit data associated with the first article.

9. The method of claim 8, wherein the content advertising visit data is based at least in part on a number of users that visited the first article.

10. The method of claim 9, wherein ranking comprises weighting the first article based at least in part on the content advertisement visit data.

11. The method of claim 3, wherein the advertising data comprises a selection score for each content advertisement displayed on the first article.

12. The method of claim 11, wherein the selection score is based at least in part on a number of users that selected a content advertisement when the content advertisement was displayed with the first article.

13. The method of claim 11, wherein the selection score comprises a ratio of users that selected a content advertisement when the content advertisement was displayed with the first article.

14. The method of claim 11, wherein the content advertisements each comprise advertising terms, the first article comprises text, and ranking is determined at least in part by augmenting text of the first article with the advertising terms of at least a content advertisement with a highest selection score.

15. The method of claim 11, wherein the content advertisements each comprise advertising terms, the first article comprises text, and ranking is determined at least in part by augmenting the text of the first article with weighted advertising terms, wherein the weighted advertising terms are weighted based on the selection score of the content advertisement that they came from.

16. The method of claim 3, wherein the first article is a source article and comprises content terms representing the content of the first article.

17. The method of claim 16, wherein ranking is determined at least in part by augmenting text of the first article with the content terms.

18. One or more non-transitory computer-readable storage media containing program code for ranking search results, the program code comprising:
  program code for receiving a search query;
  program code for identifying a plurality of articles relevant to the search query;
  program code for identifying advertisements associated with the search query;
  program code for determining advertising data associated with the advertisements; and
  program code for ranking the articles based at least in part on the advertising data.

19. The non-transitory computer readable storage medium of claim 18, wherein determining advertising data comprises program code for determining information related to search advertisements associated with the search query.

20. The non-transitory computer-readable storage medium of claim 18, wherein determining advertising data comprises determining information related to content advertisements associated with at least a first article from the plurality of articles.

21. The non-transitory computer-readable storage medium of claim 19, wherein the advertising data comprises a selection score for each search advertisement displayed for the search query.

22. The non-transitory computer-readable storage medium of claim 21, wherein the selection score is based at least in part on a number of users that selected a search advertisement when displayed for the search query.

23. The non-transitory computer readable storage medium of claim 21, wherein the selection score comprises a ratio of users that selected a search advertisement when displayed for the search query.

24. The non-transitory computer-readable storage medium of claim 21, wherein ranking the articles comprises program code for weighting the articles based at least in part on the selection scores for the search advertisements.

25. The non-transitory computer-readable storage medium of claim 20, wherein the advertising data comprises content advertising visit data associated with the first article.

26. The non-transitory computer-readable storage medium of claim 25, wherein the content advertising visit data is based at least in part on a number of users that visited the first article.

27. The non-transitory computer-readable storage medium of claim 26, wherein ranking comprises program code for weighting the first article based at least in part on the content advertisement visit data.

28. The non-transitory computer-readable storage medium of claim 20, wherein the advertising data comprises a selection score for each content advertisement displayed on the first article.

29. The non-transitory computer-readable storage medium of claim 28, wherein the selection score is based at least in part on a number of users that selected a content advertisement when the content advertisement was displayed with the first article.

30. The non-transitory computer-readable storage medium of claim 28, wherein the selection score comprises a ratio of users that selected a content advertisement when the content advertisement was displayed with the first article.

31. The non-transitory computer-readable storage medium of claim 28, wherein the content advertisements each comprise advertising terms, the first article comprises text, and ranking is determined at least in part by augmenting the text of the first article with the advertising terms of at least a content advertisement with a highest selection score.

32. The non-transitory computer-readable storage medium of claim 28, wherein the content advertisements each comprise advertising terms, the first article comprises text, and ranking is determined at least in part by augmenting the text of the first article with weighted advertising terms, wherein the advertising terms are weighted based on the selection score of the content advertisement that they came from.

33. The non-transitory computer-readable storage medium of claim 20, wherein the first article is a source article and comprises content terms representing the content of the first article.

34. The non-transitory computer-readable storage medium of claim 33, wherein the ranking score is determined at least in part by augmenting text of the first article with the content terms.

35. A method for ranking search results using a processor-based device, the method comprising:
  receiving a search query from a user;
  identifying a collection of source documents based on terms of the search query and textual contents of the source documents;
  identifying one or more content advertisements displayed on the source documents in the collection;
  ranking the source documents based at least in part on one or more characteristics of previous user interaction with the content advertisements; and
  based on the ranking, presenting at least some of the collection of source documents in a ranked order to the user.

36. The method of claim 35, wherein the source documents are ranked based at least in part on a number of users who purchased an advertised product after clicking on a content advertisement.

37. The method of claim 35, wherein the source documents are ranked based at least in part on a text of a content advertisement.

38. The method of claim 35, wherein the source documents are ranked based at least in part on a ratio or a number of users who clicked on a content advertisement.

39. The method of claim 35, wherein identifying a set of source documents that are responsive to the search query comprises:
   accessing an index of source documents indexed in accordance with terms in the source documents, and
   matching terms in the search query with the indexed terms in the source documents.

40. A method for ranking search results using a processor-based device, the method comprising:
   receiving terms of a search query from a user;
   identifying a collection of source documents based on terms of the search query and textual contents of the source documents;
   identifying one or more search advertisements based on the terms of the search query;
   ranking the source documents based at least in part on one or more characteristics of previous user interaction with the search advertisements; and
   based on the ranking, presenting at least some of the collection of source documents in a ranked order to the user.

41. The method of claim 40, wherein the source documents are ranked based at least in part on a number of users who purchased an advertised product after clicking on a search advertisement.

42. The method of claim 40, wherein the source documents are ranked based at least in part on a text of a search advertisement.

43. The method of claim 40, wherein the source documents are ranked based at least in part on a ratio or a number of users who clicked on a search advertisement.

44. The method of claim 40, wherein identifying a set of source documents comprises:
   accessing an index of source documents indexed in accordance with terms in the source documents, and
   matching the terms of search query with the indexed terms in the source documents.

* * * * *

UNITED STATES PATENT AND TRADEMARK OFFICE
CERTIFICATE OF CORRECTION

| | | |
|---|---|---|
| PATENT NO. | : 8,676,790 B1 | Page 1 of 1 |
| APPLICATION NO. | : 10/728673 | |
| DATED | : March 18, 2014 | |
| INVENTOR(S) | : Henzinger et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3111 days.

Signed and Sealed this
Eighth Day of September, 2015

Michelle K. Lee
*Director of the United States Patent and Trademark Office*